(No Model.)

D. GUILE.
VEHICLE RUB IRON.

No. 400,451. Patented Apr. 2, 1889.

Witnesses.
Wm. S. Hodges.
Chas. P. Roberts.

Inventor.
Delbert Guile,
By Patrick O'Farrell,
Attorney.

UNITED STATES PATENT OFFICE.

DELBERT GUILE, OF FILLMORE, ILLINOIS.

VEHICLE RUB-IRON.

SPECIFICATION forming part of Letters Patent No. 400,451, dated April 2, 1889.

Application filed September 26, 1888. Serial No. 286,477. (No model.)

*To all whom it may concern:*

Be it known that I, DELBERT GUILE, a citizen of the United States of America, residing at Fillmore, in the county of Montgomery and 5 State of Illinois, have invented certain new and useful Improvements in Rub-Irons, of which the following is a specification, reference being had therein to the accompanying drawings.

10 This invention pertains to certain new and useful improvements in vehicle attachments, having for its object the provision of new and improved highly-efficient means for preventing the front wheel of a wagon from wearing 15 the sides thereof when turning.

The invention comprises the detail construction, combination, and arrangement of parts, substantially as hereinafter fully set forth.

Figure 1:
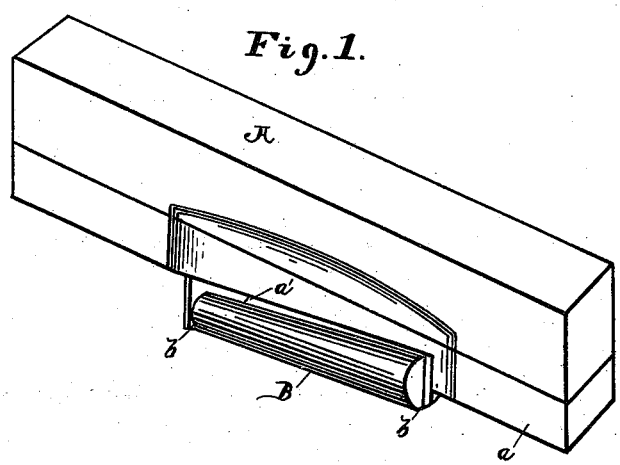
Figure 2:
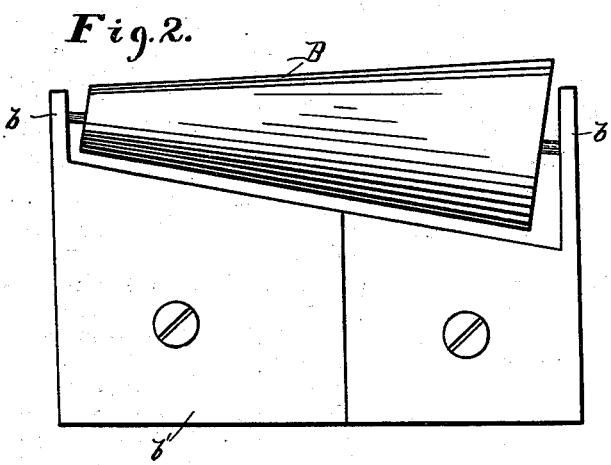
Figure 3:
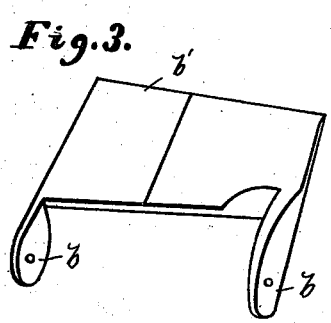

20 In the accompanying drawings, Figure 1 is a view in perspective of a portion of a wagon-body with my invention applied thereto. Fig. 2 is a bottom plan view. Fig. 3 is a detail.

Referring to the drawings, A designates a 25 portion of a wagon-body, in the bottom $a$ of which, at each side, is formed an inclined groove or recess, $a'$.

B is a tapering cone-shaped roll pivotally secured at its ends between outwardly-projecting 30 ears $b$ $b$ of a bracket, $b'$, attached to the under side of bottom $a$. This cone-shaped roll occupies an inclined plane, its forward thickened end being held up against the inner end of the inclined groove or recess $a'$, while its narrow outer end is held out from 35 the bottom $a$ a short distance.

It is obvious that in the turning of a wagon the tire of the front wheel will come in contact with the inclined cone-shaped roll, which will immediately revolve with the wheel, and 40 thus prevent locking of the wheel or the wearing out of the wagon-body. By means of my invention the progress of the vehicle is not impeded by reason of the wheel coming in contact with the roll, which, as before stated, 45 moves with the wheel.

My invention is extremely simple, cheap, and durable.

I claim as my invention—

The combination, with a wagon-body having 50 an inclined groove or recess in its lower side edges, of the bracket having outwardly and downwardly projecting arms, one of which is longer than the other, and the inclined cone-shaped roll pivoted between said arms and 55 located within said groove or recess, substantially as set forth.

In testimony whereof I affix my signature in presence of two witnesses.

DELBERT GUILE.

Witnesses:
MARK MASON,
T. H. LANE.